March 23, 1937. L. C. HOLLOMAN ET AL 2,074,788
MEANS FOR DELINTING COTTONSEED OR THE LIKE
Filed June 26, 1935 2 Sheets-Sheet 1
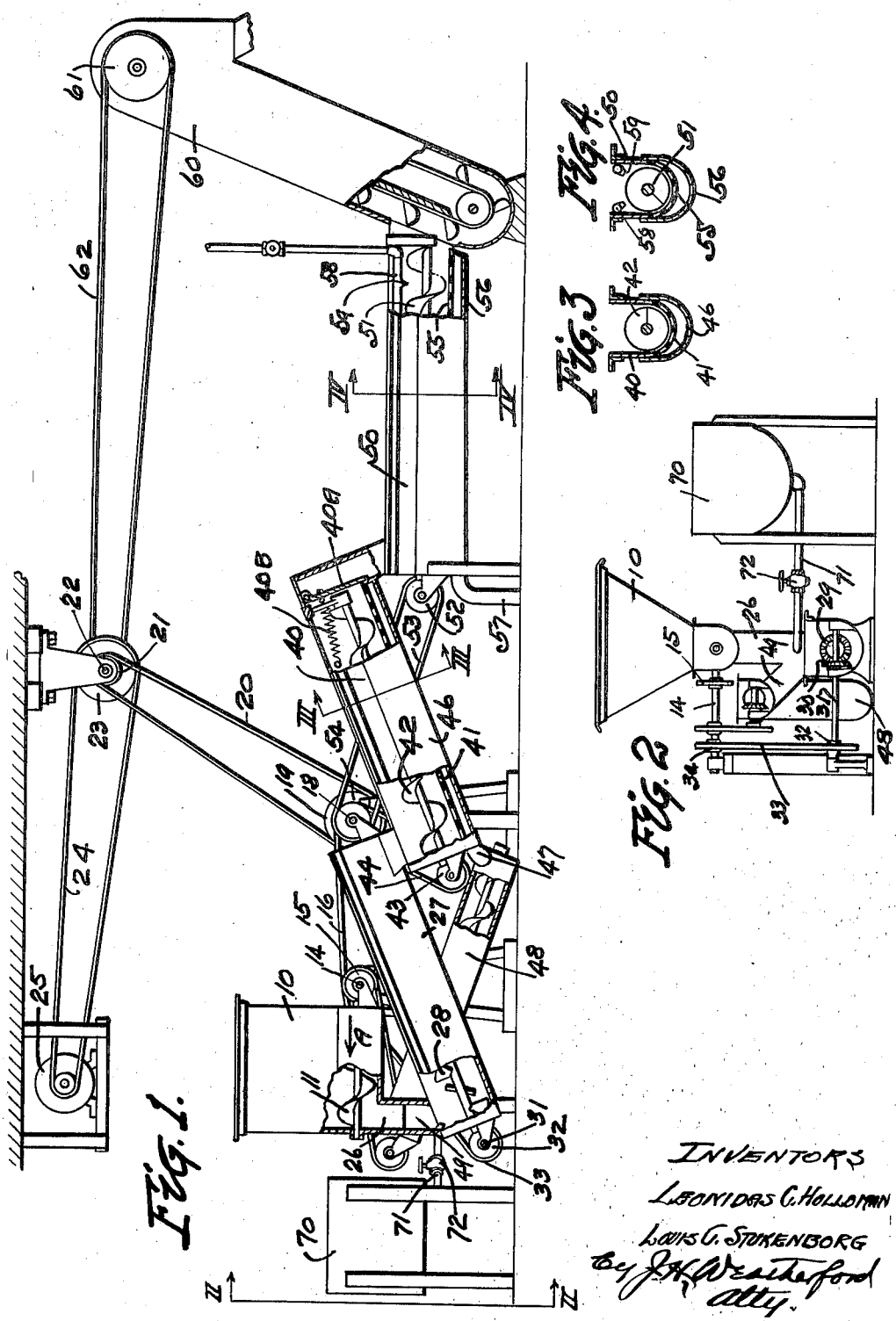

March 23, 1937. L. C. HOLLOMAN ET AL 2,074,788
MEANS FOR DELINTING COTTONSEED OR THE LIKE
Filed June 26, 1935 2 Sheets-Sheet 2
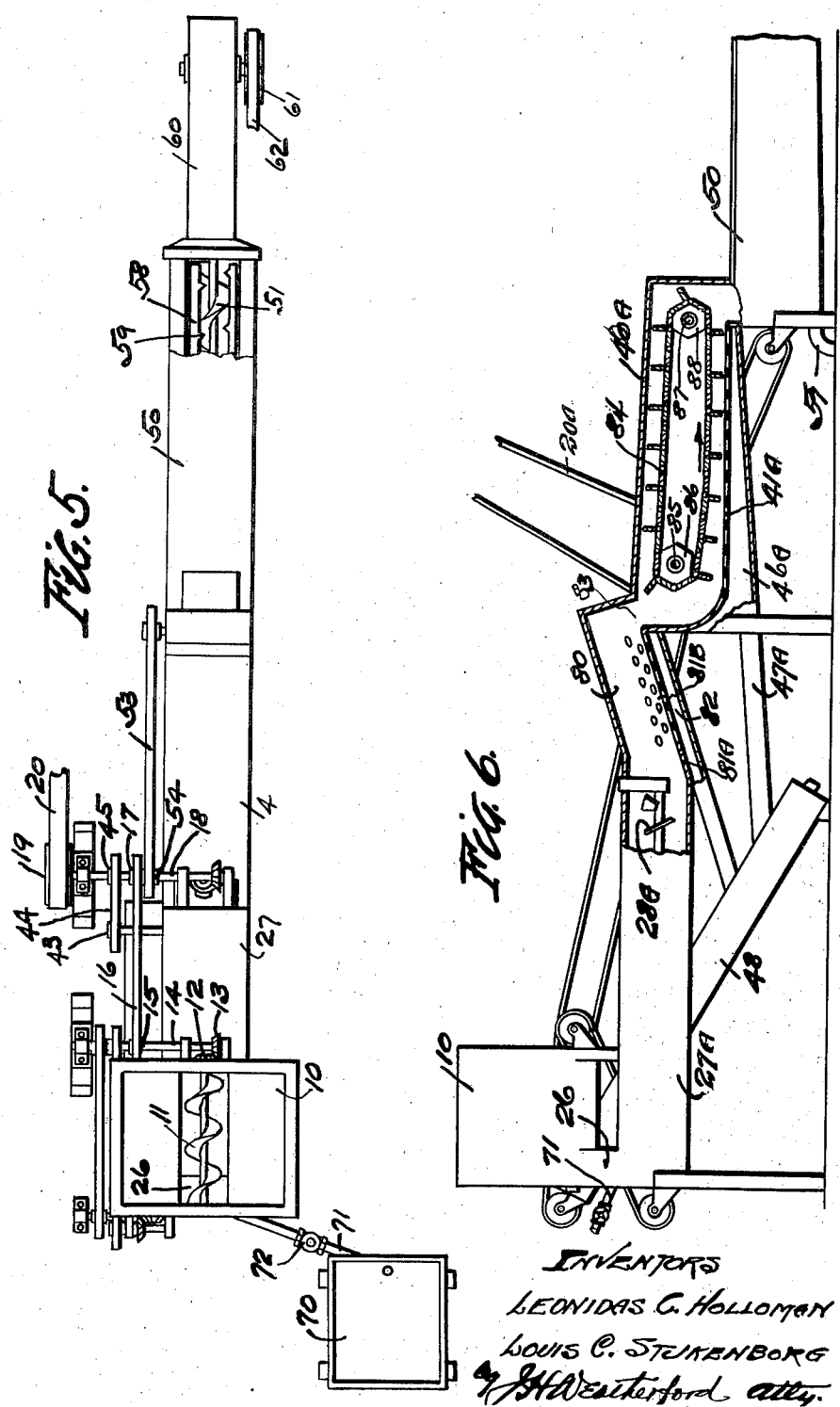

Patented Mar. 23, 1937

2,074,788

UNITED STATES PATENT OFFICE 2,074,788

MEANS FOR DELINTING COTTONSEED OR THE LIKE

Leonidas C. Holloman and Louis C. Stukenborg, Memphis, Tenn.; said Holloman assignor to Delinting Cotton Seed Company, Inc., Memphis, Tenn., a corporation of Tennessee Application June 26, 1935, Serial No. 28,428

3 Claims. (Cl. 83—28)

This invention relates to means for delinting cottonseed or the like and has particular reference to means and methods which chemically remove the fiber.

When cotton seed are ginned there is ordinarily left on the seed a very considerable amount of a fiber which is extremely objectionable, where the seed are to be used for planting. This fiber not only causes the seed to stick together in groups preventing even distribution, but also is a notorious carrier of various forms of plant disease.

Delinting has been mechanically accomplished with more or less success, but such delinting is liable to crush a portion at least of the seed and in addition, does not eliminate the disease carrying properties.

Numerous experiments have been made and it has been found entirely feasible to remove the lint by a treatment of the seed with concentrated sulphuric acid. Such experiments as have been made however, are largely crude, requiring much hand labor and owing to the nature of the acid used, often causes serious damage not only to the clothing, but also to the person of those performing the operation.

In an endeavor to get away from these troubles certain types of mechanical devices have been introduced which perform the operations mechanically without the intervention of a serious amount of hand labor, but so far as is known, apparatus of this kind has been so wasteful of acid as to render the process too expensive for practical use, and in addition has released such large quantities of unspent acid into drains and through these drains into streams as to cause the use of the devices to be barred as soon as their damaging effect is fully realized.

The primary object of the present invention is to treat the seed thoroughly with acid, to free the seed as thoroughly as possible from such acid without dilution thereof and to re-use such removed acid, and after such removal of the acid to complete the operation by necessary washing.

A further object is to provide a simple, efficient and automatic mechanism in which the acid is efficiently brought in contact with and distributed through the seed, thereby accomplishing complete delinting of the seed, and in which subsequently the seed are thoroughly drained and free acid is efficiently drained off and carried back for re-use; and after such acid removal, the seed are thoroughly washed and conveyed to drying means preparatory to sacking and shipping.

A further object is to provide means for subjecting the seed, after treatment with the acid to pressure whereby to remove and recover as much acid as possible prior to washing them.

A still further object of the invention is to provide a method for treating seed which substantially embraces a cycle such as above described.

The means by which these and other objects are accomplished and the manner of their accomplishment will readily be seen from the following specification on reference to the accompanying drawings in which,—

Fig. 1 is a side elevation of the apparatus, certain portions being broken away in order to show interior portions.

Fig. 2 is an end elevation of the apparatus shown in Fig. 1.

Figs. 3 and 4 are sections taken as on the lines III—III and IV—IV respectively of Fig. 1.

Fig. 5 is a plan view of the same apparatus.

Fig. 6 is a side elevation partially in section showing modifications in various parts of the mechanism used.

Referring now to the drawings in which the various parts are indicated by numerals, 10 is a hopper into which the seed are dumped or otherwise placed to begin the treating operation. Within the hopper is a conveyor 11 which is operated as by bevel gears 12 and 13. The bevel gear 13 is mounted on a shaft 14 which also carries a belt pulley 15, driven as by a belt 16 from a pulley 17 mounted on a shaft 18. The shaft 18 carries a pulley 19 driven as by a belt 20 from a pulley 21 and a counter shaft 22, this counter shaft also carrying a pulley 23 driven as by a belt 24 from a motor 25.

The conveyor 11 conveys seed within the hopper in the direction of the arrow A to a chute 26 which discharges into a treating trough 27 which may be and is shown inclined, and in which is disposed a screw conveyor 28 which is indicated as having paddles or flights rather than as a continuous screw conveyor. 29 is a bevel gear on the conveyor shaft, which is driven by a bevel gear 30 on a shaft 31. This shaft also carries a pulley 32 which is driven as through a belt 33 from a pulley 34 on the shaft 14.

The treating trough 27 discharges into a drain trough 40, the bottom 41 of which trough is perforated, and in which is disposed a conveyor screw 42 which may be driven as by bevel gears similar to those above described, these gears being driven by a pulley 43 through a shaft 43A, pulley 43 being driven by a belt 44, from a pulley 45 on the shaft 18. The discharge end of the trough may be provided with a swinging door 40A held normally closed as by a tension spring 40B, the door being forced open by the seed to allow discharge of the seed and setting up on the seed a pressure which assists in draining them.

Below the drain trough 40, is a channel 46 the lower end of which is connected by a suitable chute 47 into the lower end of an Archimedes screw 48 by which the liquid draining thereinto is raised and discharged into an inclined chute 49, this chute discharging into the feed end of the treating trough 27.

The drain trough 40 discharges into a washing trough 50 in which is disposed a conveyor screw 51 driven as before through bevel gears not shown, by a pulley 52, belt 53, and pulley 54 on the shaft 18. The bottom 55 of the trough 50 is perforated, and disposed beneath the perforated bottom is a drain channel 56 from which a drain pipe 57 leads as to a sewer or the like not shown. 58 are spray pipes provided with suitable openings or nozzles 59 through which washing water may be discharged.

The trough 50 discharges into an elevator 60 by which the washed seeds are raised and discharged as to a dryer not shown. The elevator may be driven as by a pulley 61 and belt 62 from the counter shaft 22.

70 is an acid tank in which the acid is placed or stored for use and from which the acid is delivered, through a pipe 71 controlled by a valve 72, into the feed end of the treating trough 27.

Fig. 6 shows a modified form of the device in which the treating trough 27A is horizontally disposed. The trough 27A discharges through an upwardly inclined chute 80 having a bottom of which a minor portion 81A adjacent the trough 27A is preferably imperforate to maintain a liquid level in the trough, and the remaining portion 81B is perforated to provide drainage. Below chute 80 is a drain channel 82 leading into the Archimedes screw 48.

83 is a spout discharging from chute 80 into drain trough 40A which as before has a perforated bottom 41A, and an underlying drain channel 46A, leading back into the Archimedes screw 48. The drain trough 40A is preferably provided with a flight conveyor 84 having the shaft 85 and sprockets 86 at the feed-in end of the trough spaced further from the bottom of the trough than the complementary shaft 87 and sprockets 88 at the discharge end of the trough whereby compression is effected on seed carried thereby. Preferably also the flights are of sufficient weight and the conveyor has such sag as to also accomplish compression on the seed.

It will be here understood that the mechanism here shown is typical only and particularly that the driving mechanism is introduced merely as a typical way by which such drive may be accomplished. The top of the various troughs may be closed or open as may be found most convenient.

In using the device acid is placed in the tank 70 and cottonseed in the hopper 10. After the cottonseed is fed from the hopper 10 into the treating trough 27, the valve 72 is opened and acid allowed to flow into the trough, the acid being delivered as the seed are also fed continuously into the trough, only such amount of acid being introduced as is found necessary to thoroughly coat the seed, though this usually is considerably in excess of the amount actually necessary to effect carbonization of the lint. The seed and acid are thoroughly mixed in the feed end of the trough 27 by the screw 28 and are conveyed, and further mixed by the screw 28, to the discharge end of the trough, where both acid and seed are delivered into the draining trough. It has been found where the trough 27 is inclined, that in spite of such inclining, the seed pushed upward along the bottom of the trough substantially prevents any acid draining along the bottom of the trough back into the lower end thereof and that both seed and acid are delivered at the discharge end into the drain trough.

The acid and seed delivered into the drain trough 40 are moved therethrough by the conveyor screw 42 and surplus acid as well as spent acid is drained through the screened bottom and conveyed to the Archimedes screw 48 by which screw it is raised and delivered back into the lower end or boot of the treating trough 27, to again commence the treating cycle. This draining action is much improved by the compressive action set up on the seed between the screw 42 and the spring pressed door 40A.

In the modified form shown in Fig. 6, even more positive compression is exerted on the seed by the screw 28A in forcing them upward through the chute 80 and by the further compressive action exerted by the flight conveyor 84 in moving the seed through the drain trough 40A, so that an even greater freeing of the seed from acid is accomplished before their delivery to the washing trough.

The seed thus freed to a large extent from acid, are discharged from the drain trough 40 or 40A, as the case may be, into the washing trough 50 and when so discharged are largely free from active acid, the surface being coated principally with spent acid in which the lint of the seed is dissolved. In the washing trough the seed is subjected to a heavy spray of washing water and at the same time is agitated and moved forward by the conveyor screw 51, the trough being horizontally disposed and the bottom perforated. The washing water is immediately discharged with its content of acid through the screened trough bottom into the drainage channel so that the most effective washing is secured. At the same time since all the drainage water passes into the drainage channel, a maximum dilution of such active acid as may have been carried forward with the seed is accomplished. From the washer the seed are carried to a suitable drying means (not shown), this preferably being done by elevating them with the bucket conveyor or elevator 60, which may have perforated buckets if this should be found desirable.

What we claim is:

1. Means for delinting lint covered seed, which comprises a treating trough, means for delivering seed and means for delivering acid into the feed end of said trough, means for agitating said seed and acid, and for discharging same from the discharge end of said trough; a drainage trough, having one end disposed below the discharge end of said treating trough, said drainage trough having a screened bottom, means for agitating and advancing seed along and discharging same from said drainage trough, means for restraining discharge of seed from said trough to exert pressure on such seed, means disposed below said drainage trough to receive and remove acid drained therefrom, means for returning such liquid into the feed end of said treating trough; a washing trough disposed to receive seed discharged from said drainage trough, said washing trough having a perforated bottom, means to agitate, advance and discharge seed from said washing trough, and means for discharging washing water against said seed during passage through said washing trough.

2. Means for delinting lint covered seed, which comprises a treating trough, means for delivering seed, and means for delivering acid into the feed end of said trough, a conveyor screw in said trough, means for rotating said screw to agitate said acid and seed and discharge same from the discharge end of said trough, a drainage trough, having a screened bottom, the feed end of said drainage trough being disposed below the discharge end of said treating trough, a conveyor for advancing, and agitating said seed, and discharging seed from said drainage trough, a door hingedly secured to the top of said conveyor and depending across the end of said drainage conveyor, and a spring urging said door into closed position to exert pressure on said seed to resist discharge thereof and increase drainage therefrom, a channel disposed below said drainage trough to receive and remove liquid drained therefrom, means disposed to receive discharge from said channels for returning such liquid into the feed end of said treating trough; a washing trough disposed to receive seed discharged from said drainage trough, a conveyor screw for agitating advancing and discharging seed from said washing trough, means for driving said screw and means for spraying said seed during passage through said washing trough.

3. Means for delinting lint covered seed, which comprises a treating trough, means for delivering seed and means for delivering acid into the feed end of said trough, means for agitating said seed and acid, and for discharging same from the discharge end of said trough; a drainage trough, having one end disposed below the discharge end of said treating trough, said drainage trough having a screened bottom, means for agitating and advancing seed along and discharging same from said drainage trough, means disposed below said drainage trough to receive and remove acid drained therefrom, means for returning such liquid into the feed end of said treating trough; a washing trough disposed to receive seed discharged from said drainage trough, said washing trough having a perforated bottom, means to agitate, advance and discharge seed from said washing trough, and means for discharging washing water against said seed during passage through said washing trough.

LEONIDAS C. HOLLOMAN.
LOUIS C. STUKENBORG.